US012618771B2

(12) United States Patent
Ramea Kubendran et al.

(10) Patent No.: US 12,618,771 B2
(45) Date of Patent: May 5, 2026

(54) GENERATING HIGH-RESOLUTION CONCENTRATION MAPS FOR ATMOSPHERIC GASES USING GEOGRAPHY-INFORMED MACHINE LEARNING

(71) Applicant: Palo Alto Research Center Incorporated, Palo Alto, CA (US)

(72) Inventors: Kalaivani Ramea Kubendran, Fremont, CA (US); Md Nurul Huda, Hillsboro, OR (US); David Schwartz, Concord, MA (US); Jeyasri Subramanian, Sunnyvale, CA (US)

(73) Assignee: Genesee Valley Innovations, LLC, Santa Clara, CA (US)

( * ) Notice: Subject to any disclaimer, the term of this patent is extended or adjusted under 35 U.S.C. 154(b) by 900 days.

(21) Appl. No.: 17/816,786

(22) Filed: Aug. 2, 2022

(65) Prior Publication Data

US 2024/0044783 A1 Feb. 8, 2024

(51) Int. Cl.
| | |
|---|---|
| *G01N 21/3504* | (2014.01) |
| *G01N 21/59* | (2006.01) |
| *G01N 21/17* | (2006.01) |

(52) U.S. Cl.
CPC ......... *G01N 21/3504* (2013.01); *G01N 21/59* (2013.01); *G01N 2021/1795* (2013.01)

(58) Field of Classification Search
CPC .............. G01N 21/3504; G01N 21/59; G01N 2021/1795; G01N 2021/3531; G01S 13/9027

USPC .......................................................... 702/23
See application file for complete search history.

(56) References Cited

U.S. PATENT DOCUMENTS

| | | | | |
|---|---|---|---|---|
| 10,295,410 B2 * | 5/2019 | Nowicki | .............. | G02B 19/009 |
| 2021/0080615 A1 * | 3/2021 | Thomas | ................. | G01W 1/12 |

OTHER PUBLICATIONS

Li et al., High-spatiotemporal resolution mapping of spatiotemporally continuous atmospheric CO2 concentrations over the global continent , International Journal of Applied Earth Observation and Geoinformation vol. 108, Apr. 2022 (Year: 2022).*
A. Getis, "A History of the Concept of Spatial Autocorrelation: A Geographer's Perspective," Geographical Analysis, pp. 297-309, 2008.

(Continued)

*Primary Examiner* — Aditya S Bhat
(74) *Attorney, Agent, or Firm* — Fleit Intellectual Property Law; Jon Gibbons

(57) ABSTRACT

Generating one or more high-resolution atmospheric gas concentration maps using geography-informed machine learning includes obtaining a remote sensing dataset constrained by at least one temporal window and at least one spatial window defining a first geographic area. The remote sensing dataset includes at least a first set of atmospheric gas concentration data for a plurality of atmospheric gases. A training dataset is generated based on the remote sensing dataset. A machine learning model is trained with the training dataset to predict a plurality of atmospheric gas concentration values for at least one atmospheric gas of the plurality of atmospheric gases in a given geographic area and with a spatial resolution that is greater than a spatial resolution of atmospheric gas concentration data provided as an input to the machine learning module.

20 Claims, 6 Drawing Sheets

(56)            References Cited

OTHER PUBLICATIONS

K. d. Hoogh, A. Saucy, A. Shtein, J. Schwartz, E. A. West, A. Strassmann, M. Puhan, M. Roosli, M. Staffogia and I. Kloog, "Predicting Fine-Scale Daily NO2 for 2005-2016 Incorporating OMI Satellite Data Across Switzerland," Environmental Science and Technology, p. 10279-10287, 2019.

S. R. Shams, A. Jahani and S. Kalantary, "Artificial intelligence accuracy assessment in NO2 concentration forecasting of metropolises air," Nature Scientific Reports, 2021.

Q. He, K. Qin, J. B. Cohen, D. Loyola, D. Li, J. Shi and Y. Xue, "Spatially and temporally coherent reconstruction of tropospheric NO2 over China combining OMI and GOME-2B measurements," Environmental Research Letters, 2020.

* cited by examiner

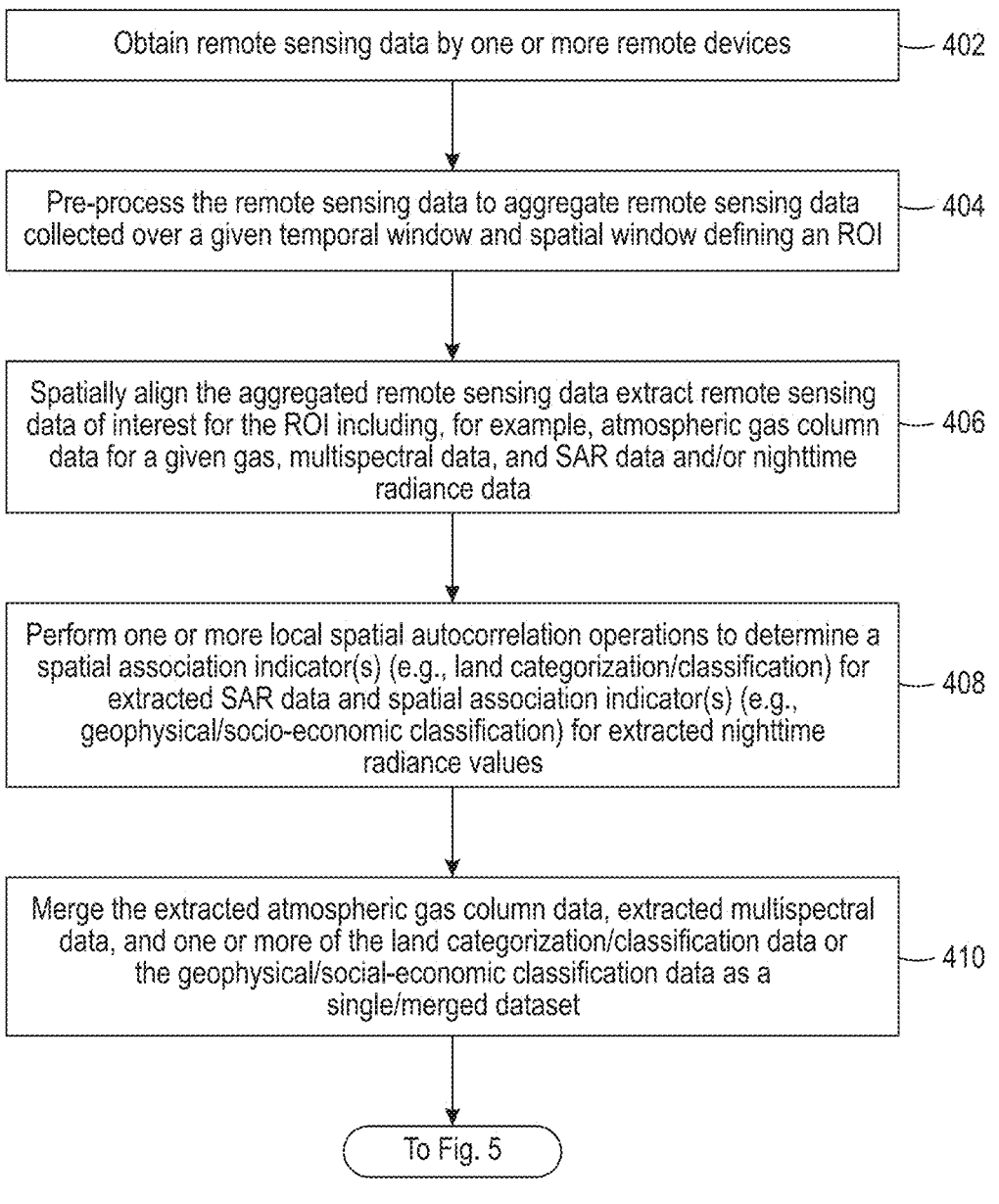

| Obtain remote sensing data by one or more remote devices | — 402 |

| Pre-process the remote sensing data to aggregate remote sensing data collected over a given temporal window and spatial window defining an ROI | — 404 |

| Spatially align the aggregated remote sensing data extract remote sensing data of interest for the ROI including, for example, atmospheric gas column data for a given gas, multispectral data, and SAR data and/or nighttime radiance data | — 406 |

| Perform one or more local spatial autocorrelation operations to determine a spatial association indicator(s) (e.g., land categorization/classification) for extracted SAR data and spatial association indicator(s) (e.g., geophysical/socio-economic classification) for extracted nighttime radiance values | — 408 |

| Merge the extracted atmospheric gas column data, extracted multispectral data, and one or more of the land categorization/classification data or the geophysical/social-economic classification data as a single/merged dataset | — 410 |

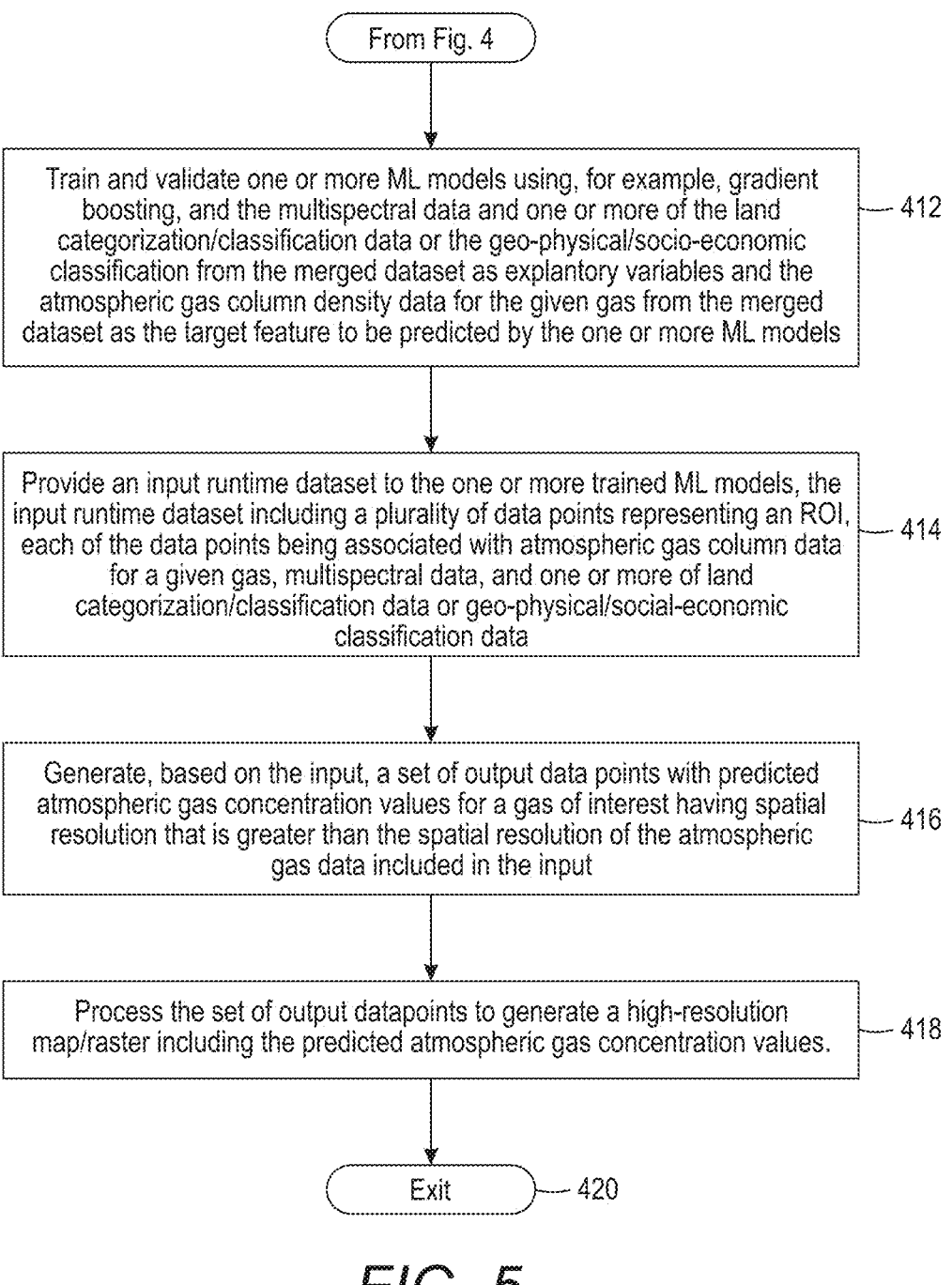

From Fig. 4

Train and validate one or more ML models using, for example, gradient boosting, and the multispectral data and one or more of the land categorization/classification data or the geo-physical/socio-economic classification from the merged dataset as explantory variables and the atmospheric gas column density data for the given gas from the merged dataset as the target feature to be predicted by the one or more ML models — 412

Provide an input runtime dataset to the one or more trained ML models, the input runtime dataset including a plurality of data points representing an ROI, each of the data points being associated with atmospheric gas column data for a given gas, multispectral data, and one or more of land categorization/classification data or geo-physical/social-economic classification data — 414

Generate, based on the input, a set of output data points with predicted atmospheric gas concentration values for a gas of interest having spatial resolution that is greater than the spatial resolution of the atmospheric gas data included in the input — 416

Process the set of output datapoints to generate a high-resolution map/raster including the predicted atmospheric gas concentration values. — 418

Exit — 420

*FIG. 5*

GENERATING HIGH-RESOLUTION CONCENTRATION MAPS FOR ATMOSPHERIC GASES USING GEOGRAPHY-INFORMED MACHINE LEARNING

TECHNICAL FIELD

The present invention is directed to systems and methods for generating high-resolution concentration maps for atmospheric gases using geography-informed machine learning.

BACKGROUND

As more policies are stipulated for air quality and climate change, there is an increasing need to monitor atmospheric gases, such as nitrogen dioxide (NO2). Monitoring atmospheric gases provides important data from air quality and public health perspectives, such as atmospheric gas concentrations, the location of "hot spots", and the like. One technique for monitoring NO2 and other atmospheric gases includes using ground sensors and on-demand measurements, such as cars, drones, or aircraft equipped with gas sensors. Although the use of ground sensors and on-demand measurements for monitoring NO2 and other atmospheric gases may reliably quantify surface-level atmospheric gases, this technique typically does not provide dense sensor networks, which are needed for developing fine-scale maps gas concentrations. Also, ground sensor observations are difficult to scale to larger regions. Another technique for monitoring atmospheric gas concentrations includes indirect observation through accounting models. In this technique, modelers use, for example, traffic datasets as a proxy to measure atmospheric gas concentration, and the like. However, with increasing adoption of electric vehicles and other types of zero-emission vehicles, there is a risk of divergence from the metrics provided by this technique and a possibility of providing misleading gas concentrations. Also, this technique typically requires surveys of the land along with human labeling, which can be expensive, time consuming, and prone to human error.

BRIEF SUMMARY

In one embodiment, a method for generating one or more high-resolution atmospheric gas concentration maps using geography-informed machine learning includes: obtaining a remote sensing dataset constrained by at least one temporal window and at least one spatial window defining a first geographic area, the remote sensing dataset comprising at least a first set of atmospheric gas concentration data for a plurality of atmospheric gases; generating a training dataset based on the remote sensing dataset; and training a machine learning model with the training dataset to predict a plurality of atmospheric gas concentration values for at least one atmospheric gas of the plurality of atmospheric gases in a given geographic area and with a spatial resolution that is greater than a spatial resolution of atmospheric gas concentration data provided as an input to the machine learning module.

In another embodiment, an information processing system for generating one or more high-resolution atmospheric gas concentration maps using geography-informed machine learning includes: a processor; memory communicatively coupled to the processor; and an atmospheric gas mapping unit communicatively coupled to the processor and the memory. The atmospheric gas mapping unit obtains a remote sensing dataset constrained by at least one temporal window and at least one spatial window defining a first geographic area. The remote sensing dataset comprising at least a first set of atmospheric gas concentration data for a plurality of atmospheric gases. The atmospheric gas mapping unit further generates a training dataset based on the remote sensing dataset, and trains a machine learning model with the training dataset to predict a plurality of atmospheric gas concentration values for at least one atmospheric gas of the plurality of atmospheric gases in a given geographic area and with a spatial resolution that is greater than a spatial resolution of atmospheric gas concentration data provided as an input to the machine learning module.

In a further embodiment, a method for generating one or more high-resolution atmospheric gas concentration maps using geography-informed machine learning includes: obtaining a remote sensing dataset constrained by at least one temporal window and at least one spatial window defining a first geographic area, the remote sensing dataset comprising at least a first set of atmospheric gas concentration data for a plurality of atmospheric gases; generating a training dataset based on the remote sensing dataset; training a machine learning model with the training dataset; and processing, by the trained machine learning model, an input dataset comprising a second set of atmospheric gas concentration data for at least one atmospheric gas of the plurality of atmospheric gases, the second set of atmospheric gas concentration data being associated with a second geographic area and having a first spatial resolution; and predicting, by the trained machine learning module based on processing the input dataset, a plurality of atmospheric gas concentration values for the at least one atmospheric gas, wherein the plurality of predicted atmospheric gas concentration. values has a second spatial resolution that is greater than the first spatial resolution.

BRIEF DESCRIPTION OF THE DRAWINGS

The foregoing and other features and advantages of the subject matter disclosed herein will be made apparent from the following detailed description taken in conjunction with the accompanying drawings, in which:

FIG. 4 and FIG. 5 are operational flow diagrams together illustrating one example method of generating high-resolution atmospheric gas maps using geography-information machine learning in accordance with one or more embodiments.

DETAILED DESCRIPTION

Given the drawbacks of conventional atmospheric gas measurement techniques, satellite remote sensing is a promising alternative for of measuring atmospheric gases. However, although public satellites can capture larger areas in one swath, the best spatial resolution for atmospheric gases currently available remains coarse (approximately 3 kilometer×3 kilometer (km)) and generally does not provide enough granular data to accurately determine how implemented policies impact the environment or regulate bad actors. As such, the techniques of one or more embodiments described herein rapidly generate near real-time, high spatial resolution atmospheric gas concentration data using a combination of satellite data, such as atmospheric monitoring, multispectral, synthetic aperture radar, visual infrared imagery, the like, or a combination thereof. A geography-informed machine learning (ML) system/unit of one or more embodiments takes the obtained satellite data as input and rapidly generates fine-scale atmospheric gas (e.g., NO2) maps for any region of interest without any field work or manual labeling effort, unlike conventional techniques. The fine-scale atmospheric gas maps generated by one or more embodiments has a higher spatial resolution (e.g., less than 1 km×1 km) than the input satellite data.

Figure 1:
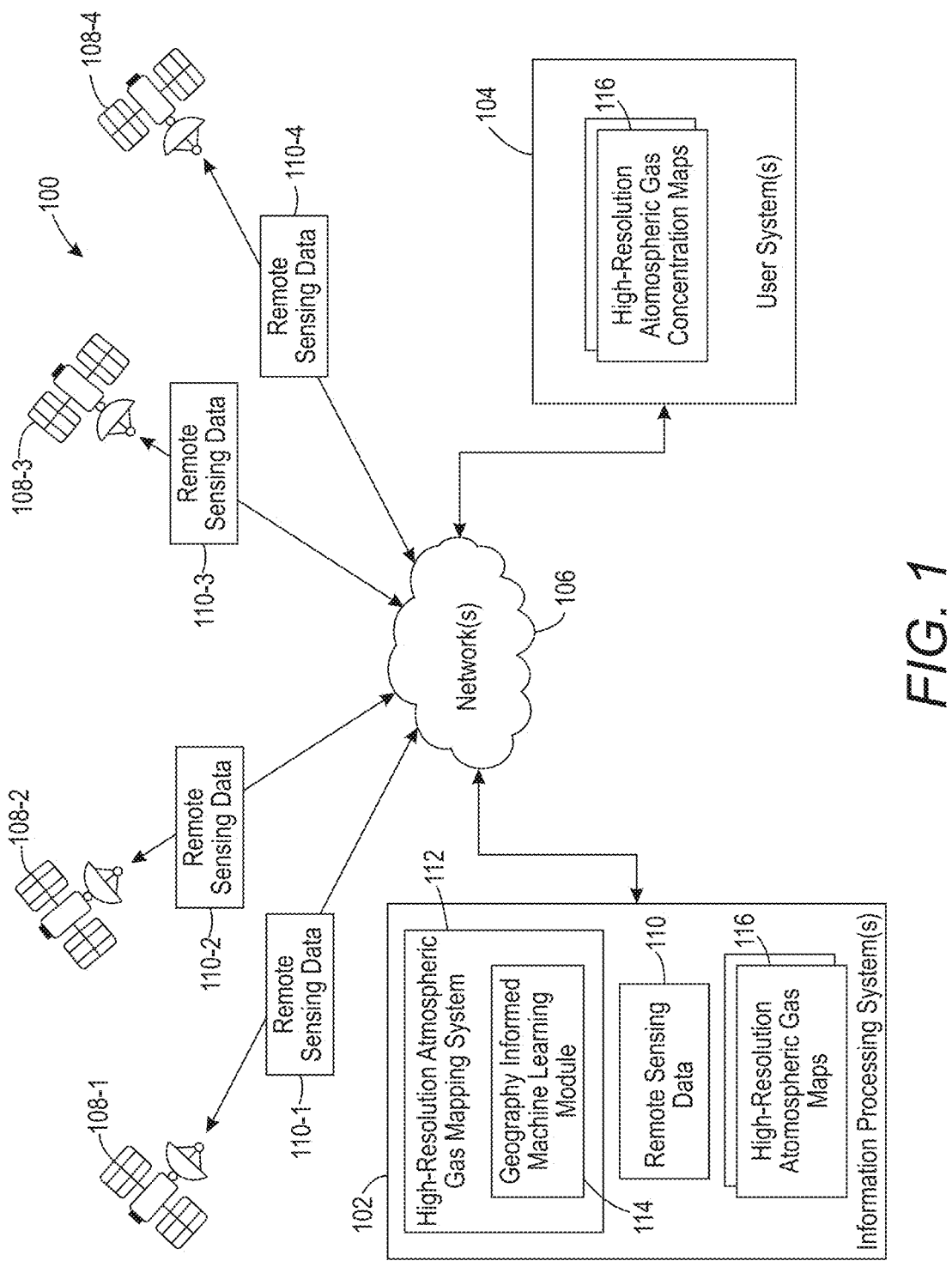
FIG. 1 is block diagram illustrating one example of an operating environment for generating high-resolution atmospheric gas maps using geography-information machine learning in accordance with one or more embodiments.

FIG. 1 illustrates one example of an operating environment 100 for generating high-resolution atmospheric gas maps using geography-information machine learning. In one or more embodiments, the operating environment 100 comprises one or more information processing systems 102 and one or more user systems 104 communicatively coupled to at least one network 106. Examples of an information processing system 102 include a server (local or remote/cloud-based), a workstation, a desktop computer, a portable computing system such as a laptop, a handheld computing device such as cellular mobile device or a tablet, or the like. Examples of a user system 104 include a portable computing system such as a laptop, a handheld computing device such as cellular mobile device or a tablet computing device, a wearable device such as a smart watch, or the like. The network(s) 106, in one or more embodiments, comprises cloud and/or non-cloud based technologies, a local area network (LAN), a general wide area network (WAN), public networks such as the Internet, private wireless communication networks, non-cellular networks such as Wireless Fidelity (Wi-Fi) networks, and/or the like.

The operating environment 100 further comprises one or more remote sensing devices/systems 108 (illustrated as remote sensing devices 108-1 to 108-4), such as artificial satellites, manned aerial vehicles, unmanned aerial vehicles, or the like. The remote sensing devices 108 are configured to collect remote sensing data 110 (illustrated as remote sensing data 110-1 to 110-4). In one example, a remote sensing device 108 (e.g., an unmanned aerial vehicle) collects the remote sensing data 110 while operating within the Earth's atmosphere. In another example, a remote sensing device 108 (e.g., a satellite) collects the remote sensing data 110 while operating above/outside the Earth's atmosphere.

Examples of remote sensing data 110 include multispectral imaging spectrometry data, multispectral data, synthetic aperture radar (SAR) data, visible infrared imaging radiometer Suite (VIIRS) data (e.g., nighttime light data), the like, or a combination thereof. Multispectral imaging spectrometry data indicates the concentrations of gases and other pollutants in the atmosphere, such as nitrogen dioxide, ozone, formaldehyde, sulfur dioxide, methane, carbon monoxide, aerosols, and the like. One example of multispectral imaging spectrometry data is the dataset collected by the Sentinel-5P satellite, which takes measurements in the ultra-violet, visible, near and short-wavelength infrared light spectrum. These measurements can be combined with auxiliary input data (e.g., air pressure, snow/ice masks, etc.) to model the concentration of each atmospheric gas based on their absorption characteristics at specific wavelengths of the light. Multispectral imaging spectrometry data includes different bands of atmospheric gas data, such as atmospheric gas column observation, which represents a concentration of the atmospheric gas, such as NO2, from the Earth's surface to the top of the Earth's atmosphere. Multispectral imaging spectrometry data typically has a maximum spatial resolution of between 3 km and 7 km.

Multispectral data captured by the remote sensing devices 108 includes data collected across multiple spectral channels. One example of multispectral data is the dataset collected by the Sentinel-2 satellites. The Sentinel-2 multispectral data is collected across thirteen spectral bands including visible and near infrared (NIR) bands, red edge bands, short wave infrared (SWIR) bands, and atmospheric bands. Another example, of multispectral data is the dataset collected by the Landsat-8 satellite. The Landsat-8 multispectral data is collected across eleven spectral bands including visible and NIR bands, SWIR bands, a panchromatic band, thermal infrared bands, a coastal/aerosol band, and a cirrus band. Multispectral data captured by the remote sensing devices 108 (e.g., satellites) can be used for various applications including monitoring plant growth, monitoring surface temperature characteristics, land cover classification, land use classification, land mapping, monitoring water quality, surface emergencies management, geology applications, and the like. Multispectral data typically has a maximum spatial resolution between 10 meters to 30 meters (m).

SAR data typically comprises two-dimensional images or three-dimensional reconstructions of objects, such as landscapes, and is used for marine monitoring, land monitoring, emergency response, and the like. One example of SAR data is the dataset collected or generated by the Sentinel-1 satellite. The maximum spatial resolution of SAR data is usually between 10 m and 60 m. VIIRS data typically comprises imagery and radiometric measurements of the land, atmosphere, cryosphere, and oceans in the visible and infrared bands of the electromagnetic spectrum. VIIRS data includes nighttime light data includes measurements of nocturnal visible and near infrared light and is typically used for estimating population, assessing electrification of remote areas, monitoring disasters and conflict, understanding biological impacts of increased light population, and the like. One example of nighttime light data is the panchromatic Day/Night band (DNB) data collected by the Suomi National Polar-orbiting Partnership (NPP) and the National Oceanic and Atmospheric Administration-20 (NOAA-20) satellites. The Day/Night band (DNB) data is collected by the visible infrared imaging radiometer suite (VIIRS) sensors implemented by the Suomi and NOAA-20 satellites, which captures data in 22 different spectral bands. The maximum resolution of the DNB data is typically 750 m. Although one or more embodiments described herein use satellites as one example of remote sensing devices 108, other types of remote sensing devices 108 are applicable as well. For example, devices, such as manned or unmanned aerial vehicles, capable of performing remote measurement/collection of the various types of data described herein from within or above the Earth's atmosphere are applicable as well.

As described in greater detail below with respect to FIG. 2, the information processing system 102 comprises a high-resolution atmospheric gas mapping system/unit 112 (referred to as "mapping system 112" or "mapping unit 112" for brevity) that includes, for example, a geography informed machine learning (GIML) module 114. The mapping system 112 takes the remote sensing data 110 generated by one or more of the remote sensing devices 108 as input and uses the GIML module 114 to rapidly generate/predict fine-scale (e.g., less than or equal to 500 meter×500 meter resolution) atmospheric gas maps 116 for any region of interest based on this input without any field work or manual labeling effort. Stated differently, the GIML module 114 takes as input data including atmospheric data gas data having a given spatial resolution and outputs data points including predicted gas concentration values having a spatial resolution that is greater than the spatial resolution of the input atmospheric data gas data. As used herein, lower spatial resolution means less detail and larger pixel or grid cell size compared to higher spatial resolution, which means more detail and a smaller pixel or grid cell size.

The information processing system 102 obtains/accesses the remote sensing data 110 directly from the remote sensing device(s) 108, through the network(s) 106, from one or more servers (not shown), the like, or a combination thereof. One or more types of remote sensing data 110, such as multi-spectral data, can be obtained by the information processing system 102 from a single remote sensing device 108 or from multiple remote sensing device 108 (e.g., the Sentinel-2 and Landsat-8 satellites) to mitigate temporal gaps in the multispectral data. In one or more embodiments, at least a portion of the remote sensing data 110 is obtained by the information processing system 102 as multi-dimensional (multi-band) imagery data (raster/map). A raster comprises, for example, a matrix of cells/pixels organized into rows and columns (or a grid) with each cell/pixel including one or more values representing information, such as atmospheric gas column data, multispectral data, or the like.

Figure 2:
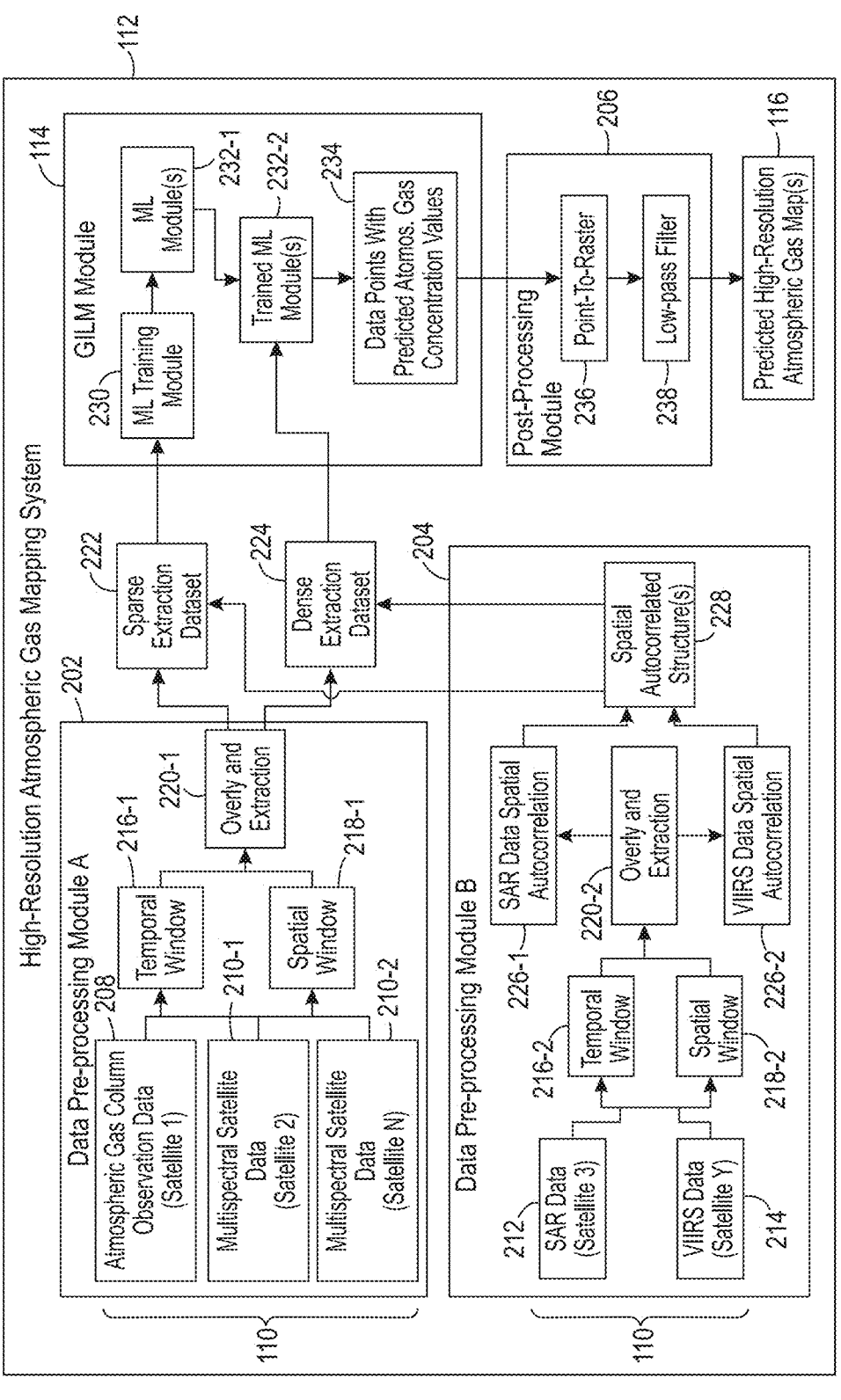
FIG. 2 is block diagram illustrating a detailed view of a mapping system for generating high-resolution atmospheric gas maps using geography-information machine learning in accordance with one or more embodiments.

FIG. 2 shows a more detailed view of the mapping system 112 implemented by the information processing system 102. In one or more embodiments, the mapping system 112 comprises the GIML module 114, a first pre-processing module 202, a second pre-processing module 204, a post-processing module 206, and one or more generated/predicted high-resolution atmospheric gas maps 116. Although FIG. 2 shows multiple components/modules of the mapping system 112 as being separate from each other, two or more of these components/modules can be combined. Also, in one or more embodiments, the components of the mapping system 112 reside on a single information processing system 102. However, in other embodiments, at least one component of the mapping system 112 resides on a different information processing system than the remaining components of the mapping system 112. Also, the mapping system 112 or one or more components of the mapping system 112 illustrated in FIG. 2 are implemented as hardware/circuitry, software, or a combination thereof.

The pre-processing modules 202 and 204 are implemented by the mapping system 112 to generate/obtain training data for one or more ML models 232-1 and to generate/obtain runtime (operational) data that is input into the trained ML models 232-1. To generate the training and the training data and operational data, the first pre-processing module 202 takes remote sensing data 110, including atmospheric gas column (observation) data 208 and multispectral data 210 (illustrated as multispectral data 210-1 and multispectral satellite data 210-2), as input. The second pre-processing module 204 takes remote sensing data 110 including SAR data 212 and VIIRS data 214 as input. In one or more embodiments, one or more of the atmospheric gas column data 208, multispectral data 210, SAR data 212, and VIIRS data 214 are represented as multi-dimensional (multi-band) imagery data (raster/map), as described above.

Each of the first pre-processing module 202 and the second pre-processing module 204 implement one or more temporal windows 216 (illustrated as temporal windows 216-1 and 216-2) and one or more spatial windows 218 (illustrated as spatial windows 218-1 and 218-2). In one or more embodiments, the temporal windows 216 and spatial windows 218 are defined such that the first pre-processing module 202 and the second pre-processing module 204 each aggregate their remote sensing data 110 spatiotemporally across different spatial resolutions. In one example, the spatial windows 218 are defined based on the region-of-interest (ROI) for which the mapping system 112 is to generate/predict a high-resolution atmospheric gas map(s) 116. For example, the spatial window 218 is defined by the size and latitude/longitude coordinates of the ROI. Also, in one or more embodiments, the spatial windows 218 are defined with a window size that provides for sufficient variation in data collected by the remote sensing devices 108. For example, a spatial window 218 can be defined with a window size of 30 km×30 km or greater, although smaller window sizes are applicable as well.

In one or more embodiments, temporal windows 216 are defined such that the first pre-processing module 202 and second pre-processing module 204 process/aggregate remote sensing data 110 collected by the remote sensing devices 108 over a sufficient period of time that provides meaningful data for performing the operations described herein. For example, if the mapping system 112 is configured to process multispectral data 210 for the ROI from two or more remote sensing devices 108 (e.g., satellites), the temporal window 216-1 is defined such that the multispectral data 210 processed/aggregated by the first pre-processing system 202 includes multispectral data 210 collected by each of the two or more remote sensing devices 108. Stated differently, the first pre-processing system 202 aggregates the input multispectral data 210 collected by the remote sensing devices 108 during a time period that is long enough to include multispectral data 210 collected by each of the two or more remote sensing devices 108. If the temporal window 216-1 is too small/short, the aggregated multispectral data 210 may not include data collected from all the remote sensing devices 108 of interest. One example of a temporal window 216-1 for multispectral data 210 is 5 days, although a lesser or greater amount of time is applicable as well.

The temporal window 216-2 for SAR data 212 and VIIRS data 214 can be the same or different from the temporal window 216-1 defined for atmospheric gas column data 208 and multispectral data 210. In one or more embodiments, SAR data 212 and VIIRS data 214 are used by the mapping system 112 to capture the underlying spatial structure of the ROI, and the changes in these datasets across time are minimal. As such, the temporal window 216-2 constraint for SAR data 212 and VIIRS data 214 can be relaxed compared to the temporal window 216-1 constraint for atmospheric gas column data 208 and multispectral data 210. One example of a temporal window 216-2 for SAR data 212 and VIIRS data 214 is between 15 and 30 days, although a lesser or greater amount of time is applicable as well.

When processing/aggregating the remote sensing data 110, the first pre-processing module 202 and the second pre-processing module 204 each process/aggregate their respective remote sensing data 110 over the time period defined by their respective temporal window(s) 216 for the spatial area associated with the ROI and constrained by the spatial window 218. For example, if the temporal window 216-1 defined for atmospheric gas column data 208 and multispectral data 210 is 5 days and the spatial window for the ROI is defined as 30 km×30 km, the first pre-processing module 202 aggregates atmospheric gas column data 208 and multispectral data 210 for the 30 km×30 km ROI area generated/collected by the remote sensing device(s) 108 over the 5 day period defined by the temporal window 216-1. Stated differently, the first pre-processing module 202 processes the atmospheric gas column data 208 and multi-spectral data 210 to identify and aggregate portions of the atmospheric gas column data 208 and multispectral data 210 associated with the defined 30 km×30 km area and collected over the define 5 day period. A similar process is performed by the second pre-processing module 204 for the SAR data 212 and VIIRS data 214.

As described above, the atmospheric gas column data 208 and multispectral data 210 can be obtained/accessed by the first pre-processing module 202 as multi-dimensional (multi-band) imagery data (raster/map). In these embodiments, the first pre-processing module 202 aggregates rasters generated by the remote sensing devices 108 representing atmospheric gas column data 208 and multispectral data 210 over the temporal window 216-1 and spatial window 218-1, and the second pre-processing module 202 aggregates rasters generated by the remote sensing devices 108 representing SAR data 212 and VIIRS 214 over the temporal window 216-2 and spatial window 218-2. In one or more embodiments, the pre-processing modules 202 comprises an overlay and extraction (OE) module 220 (illustrated as OE module 220-1 and OE module 220-2) that extracts remote sensing data 110 of interest from the rasters (or other representations of the remote sensing data 110). In other embodiments, the mapping system 112 includes a single OE module 220 that extracts remote sensing data 110 of interest from the remote sensing data 110 aggregated by both the first pre-processing module 202 and the second pre-processing module 202.

In one or more embodiments, the OE module 220-1 of the first pre-processing module 202 spatially aligns the rasters aggregated by the first pre-processing module respectively comprising the atmospheric gas column data 208, the first set of multispectral data 210-1, and the second set of multispectral data 210-2. The OE module 220-s of the second pre-processing module 204 spatially aligns the rasters aggregated by the second pre-processing module respectively comprising the SAR data 212 and the VIIRS data 214. In other embodiments, the rasters aggregated by both the first pre-processing module 202 and the second pre-processing module are spatially aligned together.

The OE modules 220 then extract data points of interest from the spatially aligned rasters. In one or more embodiments, the OE module 220-1 of the first pre-processing module 202 extracts atmospheric gas column data 208 for a gas(es) of interest and multispectral data 210 from the spatially aligned rasters for the ROI. For example, if the mapping system 112 is interested in atmospheric NO2, the OE module 220-1 extracts NO2 data, such as the total vertical column of NO2 (i.e., the ratio of the slant column density of NO2 and the total air mass factor), for each pixel/cell defining the ROI within the aggregated rasters. Examples of multispectral data extracted for each pixel/cell representing the ROI within the aggregated rasters (or other representation of the multispectral data 210) is shown below in Table 1. In this example, the multispectral bands are ordered by their feature importance. However, in other examples, the ordering does not reflect feature importance, or reflects a different configuration of feature importance. In one or more embodiments, the data extracted by the OE module 220-1 of the first pre-processing module 202 is represented as a set of data points, wherein each data point of the set of data points includes (or is associated with) latitude and longitude coordinates, atmospheric gas column data for the latitude and longitude coordinates of the data point, and multispectral band data for the latitude and longitude coordinates of the data point.

TABLE 1

| Satellite | Band | Mean Wavelength (nanometer) | Description |
|---|---|---|---|
| Sentinel-2 | B5 | 740.2 | Red Edge 1 |
| Landsat-8 | B3 | 560 | Green |
| Sentinel-2 | B12 | 2162.4 | Shortwave Infrared 2 |
| Landsat-8 | B5 | 865 | Near infrared |
| Sentinel-2 | B8 | 835.1 | Near infrared |
| Landsat-8 | B10 | 1089.5 | Thermal Infrared 1 |
| Sentinel-2 | B4 | 664.5 | Red |
| Landsat-8 | B8 | 590 | Panchromatic |
| Sentinel-2 | B10 | 1373.5 | Cirrus |
| Landsat-8 | B7 | 2160 | Shortwave Infrared 2 |
| Sentinel-2 | B9 | 945 | Water Vapor |

The OE module 220-2 of the second pre-processing module 202 extracts one or more of SAR data 212 and VIIRS data 214 of interest from the spatially aligned rasters for the ROI. For example, the OE module 220-2 extracts data provided by at least two backscatter bands from the SAR data 212 and/or nighttime radiance values (e.g., Day/Night band (DNB) data) from the VIIRS data 214. The SAR backscatter bands include a vertical transmit/vertical receive (VV) band and a vertical transmit/horizontal receive (VH) band. In the VV band, the remote sensing device 108 (e.g., Sentinel-1 satellite) transmits and receives a longitudinal electromagnetic wave with vertical polarization. In the VH band, the remote sensing device 108 transmits a longitudinal electromagnetic wave with vertical polarization but receives the wave with horizontal polarization. Accordingly, in one or more embodiments, the extracted SAR data 212 includes VV and VH band data, such as single co-polarization vertical transmit/vertical receive data and dual-band cross-polarization vertical transmit/horizontal receive data. In one or more embodiments, the data extracted by the OE module 220-2 of the second pre-processing module 204 is represented as a set of data points, wherein each data point of the set of data points includes (or is associated with) latitude and longitude coordinates, SAR data for the latitude and longitude coordinates of the data point, and nighttime radiance values for the latitude and longitude coordinates of the data point.

In one or more embodiments, the OE module(s) 220 extract the atmospheric gas column data 208, multispectral data 210, SAR data 212, and/or VIIRS data 214 from the spatially aligned rasters by generating two sets of random points at varying densities over the spatial window 218 representing the ROI. In embodiments implementing a separate OE module 220 for each pre-processing module 202 and 204, the OE modules 220 are in communication with each other such that they extract their data at the same random points. For example, one of the OE modules 220-1 can generate the random points and inform the other OE module 220-2 of the latitude and longitude coordinates of these points.

The first set of random points is referred to as a sparse point set and the second set of random points is referred to as a dense point set. The distance between the points included in the sparse point is greater than the represented distance between the points in the dense point set. For example, the sparse point set can include at least one point set every 3 km and the dense point set can include at least one point every 100 meters, although lesser or greater distances are applicable as well. Also, each point in the sparse point set and dense point set is associated with latitude and longitude coordinates within the spatial window 218-1.

For each point in the sparse point set and dense point set, the OE module(s) 220 extracts the atmospheric gas column data 208, multispectral data 210, SAR data 212, and/or VIIRS data 214 of interest at the respective locations identified by the point's latitude and longitude. The atmospheric gas column data 208, multispectral data 210, SAR data 212, and/or VIIRS data 214 extracted for the sparse point set are merged as a single dataset referred to as a sparse extraction dataset 222. Similarly, the atmospheric gas column data 208, multispectral data 210, SAR data 212, and/or VIIRS data 214 extracted for the dense point set are merged as a single dataset referred to as a dense extraction dataset 224. The mapping system 112 generates the sparse extraction dataset 222 and the dense extraction dataset 224 in parallel or at different times. For example, after the GIML module 114 has been trained using the sparse extraction dataset 222, the first pre-processing module 202 can generate the dense extraction dataset 224 in response to the mapping system 112 receiving a request to generate a predicted high-resolution atmospheric gas map 116.

In one or more embodiments, prior to the extracted SAR data 212 and/or VIIRS data 214 being merged as part of the sparse extraction dataset 222 and the dense extraction dataset 224, a spatial autocorrelation module 226 (illustrated as spatial autocorrelation module 226-1 and spatial autocorrelation module 226-2) processes the extracted SAR data 212 and/or VIIRS data 214 for each point of the sparse point set and the dense point set, respectively. For example, the spatial autocorrelation module 226 processes the extracted SAR data 212 and VIIRS data 214 (e.g., nighttime radiance values) for each point of the sparse point set to generate a spatial association indicator, such as a local Moran's I index. A similar process is performed for the extracted SAR data 212 and VIIRS data 214 (e.g., nighttime radiance values) for each point of the dense point set. A spatial association indicator is a statistic that evaluates the existence of clusters in the spatial arrangement of a given variable. The Moran's Index, also referred to as "Moran's I" is a correlation coefficient used in geography that measures the spatial autocorrelation of the dataset, i.e., the index estimates whether the given spatial data has patterns or clusters. See, for example, A. Getis, "A History of the Concept of Spatial Autocorrelation: A Geographer's Perspective," *Geographical Analysis*, pp. 297-309, 2008, which is hereby incorporated by reference in its entirety. While the global coefficient is a single value, the local Moran's I calculates the spatial autocorrelation at fixed distances or neighborhoods. Although at least some embodiments implement local Moran's I as an indicator of spatial association, other indicators of spatial association are applicable a well.

In one or more embodiments, the spatial autocorrelation module(s) 226 performs separate local spatial autocorrelation operations for the SAR data 212 and VIIRS data 214 (e.g., nighttime radiance values) extracted for data points of the sparse point set and the data points of the dense point set. For example, the spatial autocorrelation module(s) 226 calculates a local Moran's I for a given number (e.g., 8) of nearest neighbors of each data point of the sparse point set and separately calculates a local Moran's I for a given number (e.g., 8) of nearest neighbors of each data point of the dense point set. The local Moran's I operation(s) generates clusters that capture the urban areas, population density, waterbodies, and other land uses without explicitly labeling them.

As such, the output of the spatial autocorrelation module(s) 226 is a spatial autocorrelated structure(s) 228 comprising a land use categorization/classification (based on the extracted SAR data 212) and/or a geo-physical/socio-economic classification (based on the extracted VIIRS data 214) for each data point in the sparse data point set and each data point in the dense data point set. The second pre-processing module 204 (or another module) generates the sparse extraction dataset 222 by merging the spatial autocorrelation data in autocorrelated structure(s) 228 generated for the sparse point set with the atmospheric gas column data 208 and multispectral data 210 extracted for the parse point set. A similar process is performed for generating the dense extracted data set 224. As such, each of the sparse extraction dataset 222 and the dense extraction dataset 224 each comprise a plurality of data points, wherein each data point is associated with latitude and longitude coordinates, atmospheric gas column data for the latitude and longitude coordinates of the data point, multispectral band data for the latitude and longitude coordinates of the data point, and a land categorization/classification and/or a geo-physical/socio-economic classification for the latitude and longitude coordinates of the data point.

In one or more embodiments, an ML training module 230 of the mapping system 112 uses the sparse extraction dataset 222 to train one or more ML models 232-1-1 implemented by the GIML 114 to generate a set of data points with predicted atmospheric gas column density/concentration values. The ML training module 230 also selects a subset of the sparse extraction data 222 as a validation dataset to validate the ML model(s) 232-1-1 during training. The validation dataset is not observed by the ML model(s) 232-1-1 during training. In one or more embodiments, the validation dataset includes atmospheric column data 208, multispectral data 210, and a spatial autocorrelation structure(s)/data 228 associated with the same geographical area as the training dataset. However, in other embodiments, the validation dataset includes atmospheric column data 208, multispectral data 210, and spatial autocorrelation structure(s)/data 228 associated with a different geographical area as the training dataset The ML training module 230, in one or more embodiments, uses the spectral bands (e.g., see Table 1) and the spatial autocorrelation data included in the sparse extraction data 222 as input explanatory features. The ML training module 230 uses the atmospheric gas column density data included in the sparse extraction data 222 as the target feature to be predicted by ML model(s) 232-1 during training based on the input explanatory features. During training, the ML model(s) 232-1 learns correlations between the inputted multispectral band data, spatial autocorrelation structure(s)/data, and atmospheric gas column density data such that the ML model(s) 232-1 can predict atmospheric gas density/concentration values for an atmospheric gas of interest (e.g., NO2) at data points within an ROI with a higher spatial resolution than that provided by the remote sensing devices 108. For example, the atmospheric gas column data taken as input by the ML model(s) 232-1 typically has a low spatial resolution of between 3 km to 7 km. However, the multispectral band data and the spatial autocorrelation structure(s)/data taken as input by ML model
(s) 232-1 have a much higher resolution, such as 10 m, 60
m, 750 m, etc. Therefore, by learning the correlations
between the low spatial resolution atmospheric gas column
data and the high-resolution multispectral band data and
spatial autocorrelation structure(s)/data, the ML model(s)
232-1 is trained to predict atmospheric gas column density/
concentration values for data points at a higher spatial
resolution (e.g., 500 m×500 m) than that of the input
atmospheric gas column data.

In one or more embodiments, the ML training module 230
performs a gradient boosting technique to train/generate the
ML model(s) 232-1. Gradient boosting is a machine learning
technique that provides a prediction model in the form of an
ensemble of weak prediction models, such as decision/
regression trees. Stated differently, gradient boosting com-
bines several weak learners in an iterative fashion to yield a
single strong model. Gradient boosting has three main
components, a loss function, weak learners, and an additive
model. The loss function (e.g., root mean square error) is
used to estimate how "good" the model is at making
predictions with the given data. For example, if the ML
model(s) 232-1 is being trained to predict NO2 column
density values for an ROI (a regression problem), then the
loss function is defined/selected to help determine the dif-
ference between the predicted NO2 column density values
and the observed NO2 column density values. A weak
learner is one that classifies the input data but, in many
instances, no better than random guessing. A weak learner is
typically a decision/regression tree. An additive model is the
iterative and sequential approach of adding the decision
trees one step at a time. Each iteration of adding a decision
tree should reduce the value of the loss function.

For example, the training portion of the sparse extracted
dataset 222 is applied to a first decision tree and the
prediction error/loss of the first decision tree is determined
using the validation portion of the sparse extracted dataset
222. A gradient descent procedure is performed to minimize
the error/loss of the first decision tree by adding a second
decision tree that is built based on the prediction errors/loss
of the first decision tree's results. Stated differently, the
second decision tree is parameterized, and its parameters are
modified such that the residual loss is reduced while not
changing any prior decisions trees The training portion of
the sparse extracted dataset 222 is then applied to the second
decision tree and the output of the second decision tree is
added to the output of the first decision tree to correct or
improve the final output of the ML model(s) 232-1. The
prediction error/loss of the ML model(s) 232-1 including the
second decision tree is determined using the validation
portion of the sparse extracted dataset 222. An additional
decision tree is added (if needed) based on the prediction
error/loss of current the ML model(s) 232-1 including the
second decision tree. This process is iteratively performed
after a fixed number of decisions trees are added or until the
loss function reaches an acceptable level or no longer
improves on the validation dataset at least by a given
threshold. Example hyperparameters for training the ML
model(s) 232-1 include a learning rate of 0.1, a least squares
regression loss function, a number of estimators set to 50, a
maximum depth of the individual regression estimators set
to 5, a minimum number of samples required to split an
internal node set to 7, and a minimum number of samples
required to be at a leaf node set to 12. Training the ML
model(s) 232-1 with these hyperparameters achieves an
accuracy of 92% or above. However, other hyperparameters
are applicable as well.

The result of the training process is a trained ML model(s)
232-2 configured to take as input a runtime dataset, such as
the dense extracted dataset 224, comprising atmospheric gas
column data 208 having a first spatial resolution and one or
more of multispectral data 210 or spatial autocorrelated data
228. The trained ML model(s) 232-2 is further configured to
process the input runtime dataset and output a set of data
points 234 with predicted atmospheric gas concentration
values for gas(es) of interest at a second spatial resolution
that is greater than the first spatial resolution. Stated differ-
ently, the set of data points 234 includes more atmospheric
gas concentration data for the gas of interest than what was
provided to the trained ML model(s) 232-2 as input.

In one or more embodiments, the post-processing module
206 visualizes the set of data points 234 generated by the
GIML module 114 as a high-resolution map/raster 116. For
example, a point-to-raster module 236 of the post-process-
ing module 206 converts the data points to pixels at a chosen
resolution (e.g., 500 m×500 m) by performing a rasterization
operation that calculates the mean value of data points at the
given spatial scale in "square" pixels. The post-processing
module 206, in one or more embodiments, also implements
a low-pass filter for further smoothening the rasterized
output. Each of the pixels is associated with the latitude and
longitude coordinates and predicted atmospheric gas con-
centration value(s) of the corresponding data point. The
collection of pixels is referred to as a "rasterized image". In
one or more embodiments, the rasterized image is passed
into a low-pass filter 238 to further reduce noise in the data.
The low-pass filer 238 aggregates the mean of each pixel
with respect to their immediate neighboring pixels. The
output of the post-processing module 206 is a high-resolu-
tion (fine-scale) atmospheric gas map 116 comprising a
plurality of pixels for an ROI having predicted atmospheric
gas concentration values for a gas(es) of interest, such as
NO2. The high-resolution atmospheric gas map 116, in one
or more embodiments, is transmitted to (or otherwise
obtained by) one or more other systems 104 for presentation
to a user, processing/analysis, or the like.

Figure 3:
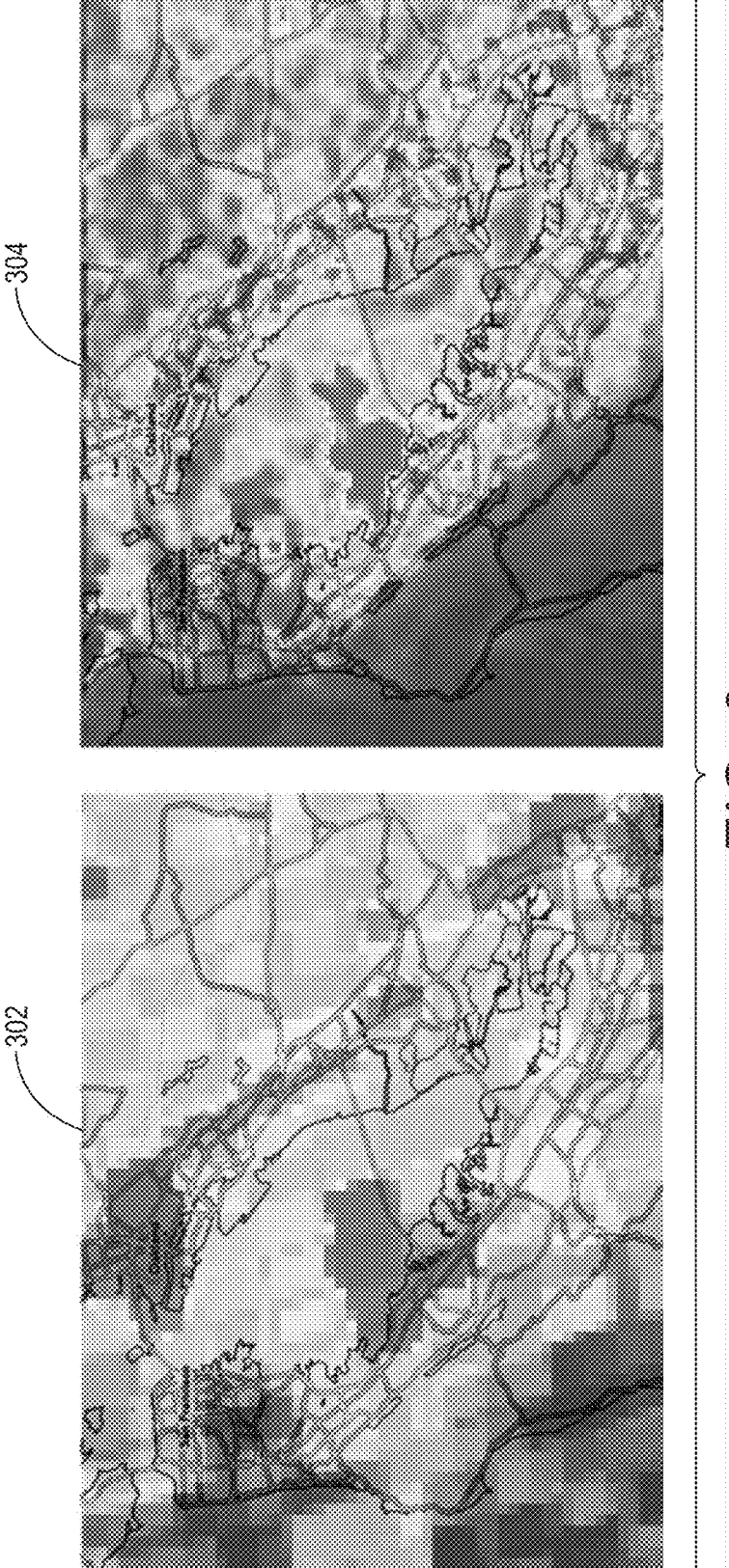
FIG. 3 illustrates a low-resolution atmospheric gas map generated by a remote sensing device, such as a satellite, and a high-resolution atmospheric gas map generated by the mapping system of FIG. 2 in accordance with one or more embodiments.

FIG. 3 shows a first atmospheric gas map 302 of an ROI
generated by a remote sensing device 108, such as the
Sentinel-5P satellite, at its current maximum resolution and
a second atmospheric gas map 304 for the ROI generated by
the mapping system 112 of one or more embodiments. As
shown, the atmospheric gas map 304 generated by the
mapping system 112 of one or more embodiments has a
much higher spatial resolution with more granular atmo-
spheric gas concentration data, as illustrated by the more
refined/granular shading, than the atmospheric gas map 302
generated by the remote sensing device 108.

FIG. 4 and FIG. 5 together illustrate an example method
400 for generating a high-resolution (fine-scale) atmo-
spheric gas map 116 comprising a plurality of data points
(pixels) for an ROI having predicted atmospheric gas con-
centration values of a gas or gasses of interest. In one or
more embodiments, the method 400 initiates at block 402
with the mapping system 112 obtaining remote sensing data
110 collected by one or more remote sensing devices 108. As
described above, the remote sensing data 110 includes, for
example, atmospheric gas column data 208, multispectral
data 210, SAR data 212, and VIIRS data 214. At block 404,
the mapping system 112 pre-processes the remote sensing
data 110 to aggregate remote sensing data 110 collected over
a given temporal window 216 and a spatial window 218
defining an ROI.

At block 406, the mapping system 112 spatially aligns the
aggregated remote sensing data 110 and extracts remote sensing data 110 of interest. As described above, the remote sensing data 110, in one or more embodiments, is represented as a raster. As such, the aggregated remote sensing data 110 is represented as aggregated spatially aligned rasters. For a plurality of data points (pixel) representing the ROI within the spatially aligned rasters, the mapping system 112 extracts remote sensing data 110 of interest, such as the total vertical column of NO2 (or other gases of interest), the multispectral bands illustrated in Table 1 above, SAR data provided by the VV and VH backscatter bands, and night-time radiance values. If the mapping system 112 is generating training data, the plurality of data points include a set of randomly selected sparse data points representing the ROI in the spatially aligned rasters. However, if the mapping system 112 is generating runtime data, the plurality of data points include a set of randomly selected dense data points representing the ROI in the spatially aligned rasters, where the dense data points have a closer distance to each other than the sparse data points.

At block 408, the mapping system 112 performs one or more local spatial autocorrelation operations to determine a spatial association indicator(s) for the extracted SAR data and a spatial association indicator(s) for the extracted night-time radiance values. For example, the mapping system 112 calculates a local Moran's I for the extracted SARs data providing a land categorization/classification of each data-point within the ROI and calculates a local Moran's I for the extracted nighttime radiance values providing a geo-physical/socio-economic classification of each datapoint within the ROI. The spatial association indicator(s) are stored within a spatial autocorrelated structure(s) 228.

At block 410, the mapping system 112 merges the extracted atmospheric gas column data, extracted multispectral data, and one or more of the land categorization/classification data or the geo-physical/socio-economic classification data as a single/merged dataset. If a training and validation dataset are being generated, the single dataset can be referred to as a sparse extraction dataset 222 and if a runtime dataset is being generated, the single dataset can be referred to as dense extraction dataset 224. Multiple instances of the operations described above with respect to blocks 402 to 410 can be run in parallel to concurrently generate the sparse extraction dataset 222 and the dense extraction dataset 224. Alternatively, the sparse extraction dataset 222 and the dense extraction dataset 224 can be generated at different times. For example, the mapping system 112 can generate the dense extraction dataset 224 at various intervals or in response to receiving a request to generate high-resolution atmospheric gas maps 116.

At block 412, the mapping system 112 trains and validates one or more ML models 232-1 using the sparse extraction dataset 222 (training/validation dataset). For example, the mapping system 112 implements a gradient boosting technique to train the ML model(s) 232-1 with extracted the spectral bands (e.g., see Table 1) and the generated spatial autocorrelation data as input explanatory features and the extracted the atmospheric gas column density data as the target feature to be predicted by ML model(s) 232-1 during training based on the input explanatory features. As described above, during training, the ML model(s) 232-1 learns correlations between the inputted multispectral band data, spatial autocorrelation structure(s)/data, and atmospheric gas column density data such that the ML model(s) 232-1 can predict atmospheric gas column density/concentration values of an atmospheric gas of interest for data points within an ROI with a higher spatial resolution than that provided by the remote sensing devices 108.

At block 414, the mapping system 112 inputs a runtime dataset, such as the dense extraction dataset 224, into the GIML module 114 comprising the trained ML models 232-1. At block 416, the GIML module 114 processes the input and outputs a set of data points 234 with predicted atmospheric gas concentration values at a spatial resolution that is greater than the spatial resolution of the atmospheric gas data included in the dense extraction dataset 224. At block 418, the mapping system 113 generates one or more high-resolution atmospheric gas maps 116 representing the data points 234 as described above with respect to FIG. 2. The process then ends at block 420.

Figure 6:
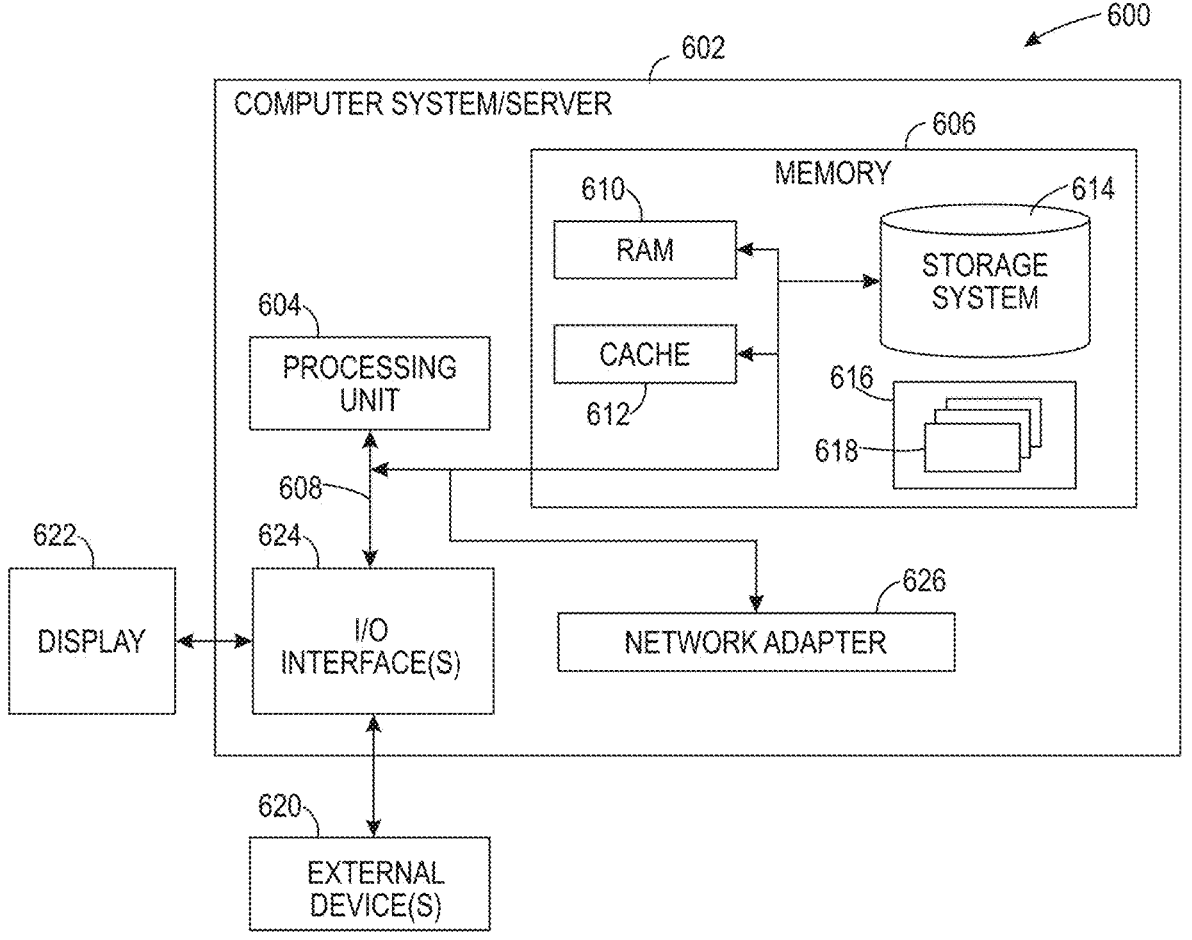
FIG. 6 is a block diagram illustrating one example of an information processing system according to one embodiment of the present disclosure.

FIG. 6 illustrates an information processing system 600 that can be utilized in embodiments of the present disclosure. The information processing system 600 is based upon a suitably configured processing system configured to implement one or more embodiments of the present disclosure such as information processing system 102 of FIG. 1.

Any suitably configured processing system can be used as the information processing system 600 in embodiments of the present disclosure. The components of the information processing system 600 can include, but are not limited to, one or more processors or processing units 602, a system memory 604, and a bus 606 that couples various system components including the system memory 604 to the processor 602. The bus 606 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

In one or more embodiments, the main memory 604 includes the mapping system 112 and its components described above with respect to FIG. 2. However, in other embodiments, the mapping system 112 resides within the processor 602 or is implemented as a separate hardware component through circuitry. The system memory 604 can also include computer system readable media in the form of volatile memory, such as random access memory (RAM) 608 and/or cache memory 610. The information processing system 600 can further include other removable/non-removable, volatile/non-volatile computer system storage media. By way of example only, a storage system 612 can be provided for reading from and writing to a non-removable or removable, non-volatile media such as one or more solid state disks and/or magnetic media (typically called a "hard drive"). A magnetic disk drive for reading from and writing to a removable, non-volatile magnetic disk and/or optical disk drive for reading from or writing to a removable, non-volatile optical disk such as a CD-ROM, DVD-ROM or other optical media can be provided. In such instances, each can be connected to the bus 606 by one or more data media interfaces. The memory 604 can include at least one program product having a set of program modules that are configured to carry out the functions of an embodiment of the present disclosure.

Program/utility 614, having a set of program modules 616, may be stored in memory 604 by way of example, and not limitation, as well as an operating system, one or more application programs, other program modules, and program data. Each of the operating system, one or more application programs, other program modules, and program data or some combination thereof, may include an implementation of a networking environment. Program modules 616 generally carry out the functions and/or methodologies of embodiments of the present disclosure.

The information processing system 600 can also communicate with one or more external devices 618 such as a keyboard, a pointing device, a display 620, etc.; one or more devices that enable a user to interact with the information processing system 600; and/or any devices (e.g., network card, modem, etc.) that enable computer system/server 600 to communicate with one or more other computing devices. Such communication can occur via I/O interfaces 622. Still yet, the information processing system 600 can communicate with one or more networks such as a local area network (LAN), a general wide area network (WAN), and/or a public network (e.g., the Internet) via network adapter 624. As depicted, the network adapter 624 communicates with the other components of information processing system 600 via the bus 606. Other hardware and/or software components can also be used in conjunction with the information processing system 600. Examples include, but are not limited to microcode, device drivers, redundant processing units, external disk drive arrays, RAID systems, tape drives, and data archival storage systems.

As will be appreciated by one of ordinary skill in the art, in view of the discussions herein, aspects of the present invention may be embodied as a system, method, or computer program product.

Accordingly, one or more aspects of the present invention may take the form of an entire hardware embodiment, an entire software embodiment (including firmware, resident software, micro-code, etc.), or an embodiment combining software and hardware aspects that may all generally be referred to herein as a "circuit", "module", or "system". Furthermore, parts of the present invention may take the form of a computer program product embodied in one or more computer-readable medium(s) having the computer readable program code embodied thereon.

A system 600 may utilize any combination of computer-readable medium(s). The computer-readable medium may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the preceding.

More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the preceding. In the context of this document, a computer-readable storage medium may be any tangible medium that can contain or store a program for use by or in connection with an instruction execution system, apparatus, or device.

A computer-readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer-readable signal medium may be any computer-readable medium that is not a computer-readable storage medium, and that can communicate, propagate, or transport a program for use by or in connection with an instruction execution system, apparatus, or device.

Program code embodied on a computer-readable medium may be transmitted using any appropriate medium, including but not limited to wireless, wireline, optical fiber cable, radio frequency (RF), etc., or any suitable combination of the preceding.

Computer program code for carrying out operations for aspects of the present invention may be written in any combination of one or more programming languages, including an object-oriented programming language such as Java, Smalltalk, C++, or the like, and conventional procedural programming languages, such as the "C" programming language or similar programming languages. According to various embodiments of the invention, the program code may execute entirely on a user's computer, partly on a user's computer, as a stand-alone software package, partly on a user's computer and partly on a remote computer or entirely on a remote computer or a server. In the latter scenario, the remote computer or the server may be connected to the user's computer through any type of network, including one or more of a local area network (LAN), a wireless communication network, a wide area network (WAN), or a connection may be made to an external computer (for example, through the Internet using an Internet Service Provider).

Aspects of the present invention have been discussed above with reference to flowchart illustrations and/or block diagrams of methods, apparatus (systems), and computer program products according to various embodiments of the invention. One or more of the operations illustrated in any of the flowchart illustrations can be performed in a differing order. Other operations, for example, can be added, modified, enhanced, condensed, integrated, or consolidated. Variations thereof are envisioned and are intended to fall within the scope of the appended claims. Also, each block of the flowchart illustrations and/or block diagrams and combinations of blocks in the flowchart illustrations and block diagrams can be implemented by computer program instructions. These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer, other programmable data processing apparatus, or other devices, to function in a particular manner, such that the instructions stored in the computer-readable medium produce an article of manufacture including instructions which implement the function/act specified in the flowchart and/or block diagram block or blocks.

The computer program instructions may also be loaded onto a computer, other programmable data processing apparatus, or other devices, to cause operational steps to be performed on the computer, other programmable apparatus, or other devices, to produce a computer-implemented process (or method) such that the computer instructions which execute on the computer or other programmable apparatus provide processes for implementing the functions/acts specified in the flowchart and/or block diagram block or blocks.

The terminology used herein is to describe particular embodiments only and is not intended to be limiting of the invention.

As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The terms "a" or "an," as used herein, are defined as one or more than one. The term plurality, as used herein, is defined as two or more than two. The term "another", as used herein, is defined as at least a second or more. The terms "including" and "having", as used herein, are defined as comprising (i.e., open language). The term "coupled", as used herein, is defined as "connected," although not necessarily directly and not necessarily mechanically. The term "configured to" describes the hardware, software, or a combination of hardware and software that is adapted to, set up, arranged, built, composed, constructed, designed, or that has any combination of these characteristics to carry out a given function. The term "adapted to" describes the hardware, software, or a combination of hardware and software capable of performing, able to accommodate the performance of, that is suitable to perform, or that has any combination of the characteristics mentioned above to perform a given function.

The description of the present invention has been presented for purposes of illustration and description but is not intended to be exhaustive or limited to the invention in the form disclosed. Many modifications and variations will be apparent to those of ordinary skill in the art without departing from the scope of the invention. Each embodiment was chosen and described to best explain the principles of the invention and the practical application and to enable others of ordinary skill in the art to understand the invention for various embodiments with various modifications as are suited to the particular use contemplated.

What is claimed is:

1. A method for generating one or more high-resolution atmospheric gas concentration maps using geography-informed machine learning, the method comprising:

obtaining, by an information processing system, a remote sensing dataset constrained by at least one temporal window and at least one spatial window defining a first geographic area, the remote sensing dataset comprising at least a first set of atmospheric gas concentration data for a plurality of atmospheric gases;

generating, by the information processing system, a training dataset by:

spatially and temporally aligning subsets of the remote sensing dataset, and extracting, for each raster point of a plurality of raster points in the first geographic area, a set of remote sensing features;

training, by the information processing system, a machine learning model with the training dataset to predict a plurality of atmospheric gas concentration values for at least one atmospheric gas of the plurality of atmospheric gases in a given geographic area and with a spatial resolution that is greater than a spatial resolution of atmospheric gas concentration data provided as an input to the machine learning module; and generating, by the trained machine learning model, a high-resolution atmospheric gas concentration map for the given geographic area based on the plurality of predicted atmospheric gas concentration values, wherein the high-resolution atmospheric gas concentration map is georeferenced and configured for real-time monitoring of atmospheric pollution.

2. The method of claim 1, further comprising:

processing, by the trained machine learning model, an input dataset comprising a second set of atmospheric gas concentration data for the at least one atmospheric gas, the second set of atmospheric gas concentration data being associated with a second geographic area and having a first spatial resolution; and generating, by the trained machine learning model based on processing the input dataset, a plurality of predicted atmospheric gas concentration values for the at least one atmospheric gas, wherein the plurality of predicted atmospheric gas concentration values has a second spatial resolution that is greater than the first spatial resolution.

3. The method of claim 1, wherein the remote sensing dataset further comprises a first set of multispectral data associated with the first geographic area and at least one of a synthetic aperture radar data or a nighttime radiance data associated with the first geographic area.

4. The method of claim 3, wherein the remote sensing dataset comprises a plurality of rasters including a first set of rasters representing the first set of atmospheric gas concentration data, a second set of rasters representing the first set of multispectral data, and at least one of a third set of rasters representing the synthetic aperture radar data or a fourth set of rasters representing the nighttime radiance data.

5. The method of claim 1, wherein generating the training dataset comprises:

extracting, for each raster point of the plurality of raster points, remote sensing data of interest, the extracted remote sensing data including extracted atmospheric gas concentration data for the at least one atmospheric gas, extracted multispectral data, and at least one of extracted synthetic aperture radar data or extracted nighttime radiance data; and storing at least the extracted atmospheric gas concentration data and the extracted multispectral data as the training dataset.

6. The method of claim 5, wherein generating the training dataset further comprises:

determining one or more local spatial association indicators for the at least one of the extracted synthetic aperture radar data or the extracted nighttime radiance data, wherein the one or more local spatial association indicators provide a set of spatially autocorrelated land use classifications for each raster point of the plurality of raster points; and storing the set of spatially autocorrelated land use classifications as part of the training dataset.

7. The method of claim 6, wherein determining one or more local spatial association indicators comprises calculating a local Moran's Index for the at least one of the extracted synthetic aperture radar data or the extracted nighttime radiance data.

8. The method of claim 6, wherein training the machine learning model comprises performing gradient boosting using the extracted multispectral data and the set of spatially autocorrelated land use classifications as explanatory variables and the extracted atmospheric gas concentration data as a target feature to be predicted by the machine learning model.

9. An information processing system for generating one or more high-resolution atmospheric gas concentration maps using geography-informed machine learning, the information processing system comprising:

a processor;

memory communicatively coupled to the processor; and an atmospheric gas mapping unit communicatively coupled to the processor and the memory, wherein the atmospheric gas mapping unit is configured to:

obtain a remote sensing dataset constrained by at least one temporal window and at least one spatial window defining a first geographic area, the remote sensing dataset comprising at least a first set of atmospheric gas concentration data for a plurality of atmospheric gases;

generate a training dataset by:

spatially and temporally aligning subsets of the remote sensing dataset, and extracting, for each raster point of a plurality of raster points in the first geographic area, a set remote sensing features;

train a machine learning model with the training dataset to predict a plurality of atmospheric gas concentration values for at least one atmospheric gas of the plurality of atmospheric gases in a given geographic area and with a spatial resolution that is greater than a spatial resolution of atmospheric gas concentration data provided as an input to the machine learning module; and generate, by the trained machine learning model, a high-resolution atmospheric gas concentration map for the given geographic area based on the plurality of predicted atmospheric gas concentration values, wherein the high-resolution atmospheric gas concentration map is georeferenced and configured for real-time monitoring of atmospheric pollution.

10. The information processing system of claim 9, wherein the trained machine learning model:

processes an input dataset comprising a second set of atmospheric gas concentration data for the at least one atmospheric gas, the second set of atmospheric gas concentration data being associated with a second geographic area and having a first spatial resolution; and generates, based on processing the input dataset, a plurality of predicted atmospheric gas concentration values for the at least one atmospheric gas, wherein the plurality of predicted atmospheric gas concentration values has a second spatial resolution that is greater than the first spatial resolution.

11. The information processing system of claim 9, wherein the remote sensing dataset further comprises a first set of multispectral data associated with the first geographic area and at least one of-a-Erst-set of synthetic aperture radar data or nighttime radiance data associated with the first geographic area.

12. The information processing system of claim 11, wherein the remote sensing dataset comprises a plurality of rasters including a first set of rasters representing the first set of atmospheric gas concentration data, a second set of rasters representing the first set of multispectral data, and at least one of a third set of rasters representing the synthetic aperture radar data or a fourth set of rasters representing the nighttime radiance data.

13. The information processing system of claim 9, wherein the atmospheric gas mapping unit generates the training dataset by:

for each raster point of the plurality of raster points, extracting remote sensing data of interest, the extracted remote sensing data including extracted atmospheric gas concentration data for the at least one atmospheric gas, extracted multispectral data, and at least one of extracted synthetic aperture radar data or extracted nighttime radiance data; and storing at least the extracted atmospheric gas concentration data and the extracted multispectral data as the training dataset.

14. The information processing system of claim 13, wherein the atmospheric gas mapping unit generates the training dataset further by:

determining one or more local spatial association indicators for the at least one of the extracted synthetic aperture radar data or the extracted nighttime radiance data, wherein the one or more local spatial association indicators provide a set of spatially autocorrelated land use classifications for each raster point of the plurality of raster points; and storing the set of spatially autocorrelated land use classifications as part of the training dataset.

15. The information processing system of claim 14, wherein determining one or more local spatial association indicators comprises calculating a local Moran's Index for the at least one of the extracted synthetic aperture radar data or the extracted nighttime radiance data.

16. The information processing system of claim 14, wherein the atmospheric gas mapping unit trains the machine learning model by performing gradient boosting using the extracted multispectral data and the set of spatially autocorrelated land use classifications as explanatory variables and the extracted atmospheric gas concentration data as a target feature to be predicted by the machine learning model.

17. A method for generating one or more high-resolution atmospheric gas concentration maps using geography-informed machine learning, the method comprising:

obtaining, by an information processing system, a remote sensing dataset constrained by at least one temporal window and at least one spatial window defining a first geographic area, the remote sensing dataset comprising at least a first set of atmospheric gas concentration data for a plurality of atmospheric gases;

generating, by the information processing system, a training dataset by:

spatially and temporally aligning subsets of the remote sensing dataset, and extracting, for each raster point of a plurality of raster points in the first geographic area, a set of remote sensing features;

training a machine learning model with the training dataset;

processing, by the trained machine learning model, an input dataset comprising a second set of atmospheric gas concentration data for at least one atmospheric gas of the plurality of atmospheric gases, the second set of atmospheric gas concentration data being associated with a second geographic area and having a first spatial resolution;

predicting, by the trained machine learning model based on processing the input dataset, a plurality of atmospheric gas concentration values for the at least one atmospheric gas, wherein the plurality of predicted atmospheric gas concentration values has a second spatial resolution that is greater than the first spatial resolution; and generating, by the trained machine learning model, a high-resolution atmospheric gas concentration map for the given geographic area based on the plurality of predicted atmospheric gas concentration values, wherein the high-resolution atmospheric gas concentration map is georeferenced and configured for real-time monitoring of atmospheric pollution.

18. The method of claim 17, wherein the remote sensing dataset further comprises a first set of multispectral data associated with the first geographic area and at least one of synthetic aperture radar data or nighttime radiance data associated with the first geographic area.

19. The method of claim 18, wherein the remote sensing dataset comprises a plurality of rasters including a first set of rasters representing the first set of atmospheric gas concentration data, a second set of rasters representing the first set of multispectral data, and at least one of a third set of rasters representing the synthetic aperture radar data or a fourth set of rasters representing the nighttime radiance data.

20. The method of claim 19, wherein generating the training dataset comprises:

based on the at least one temporal window and the at least one spatial window, spatially and temporally aligning a plurality of raster subsets including a subset of the first set of rasters, a subset of the second set of rasters, and a subset of at least one of the third set of rasters or the fourth set of rasters;

for each raster point in a set of randomly selected raster points constrained by the at least one spatial window, extracting remote sensing data of interest from the plurality of raster subsets, the extracted remote sensing data including extracted atmospheric gas concentration data for the at least one atmospheric gas, extracted multispectral data, and at least one of extracted synthetic aperture radar data or extracted nighttime radiance data; and storing at least the extracted atmospheric gas concentration data and the extracted multispectral data as the training dataset.

* * * * *